May 6, 1952

E. T. JAYNES 2,595,675

IMPEDANCE MEASURING APPARATUS

Filed April 21, 1945

INVENTOR
*Edwin T. Jaynes*
BY *Paul B. Hunter*
ATTORNEY

May 6, 1952            E. T. JAYNES            2,595,675
IMPEDANCE MEASURING APPARATUS
Filed April 21, 1945            2 SHEETS—SHEET 2
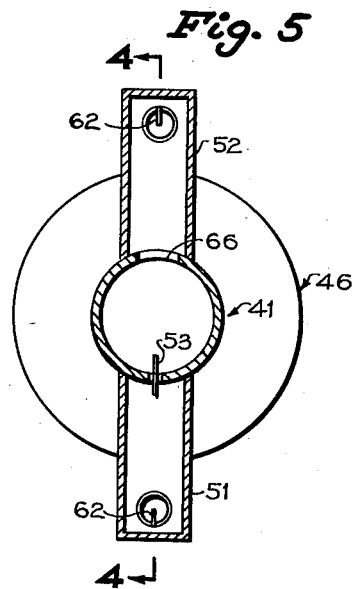
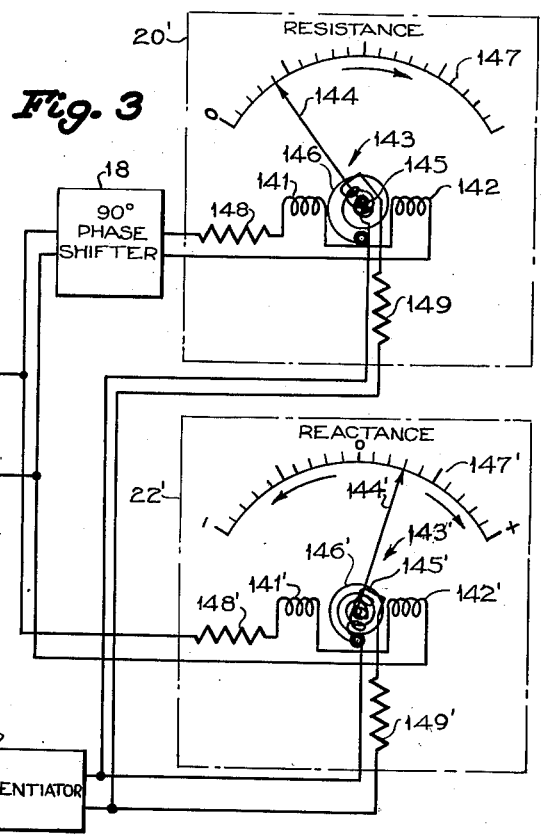
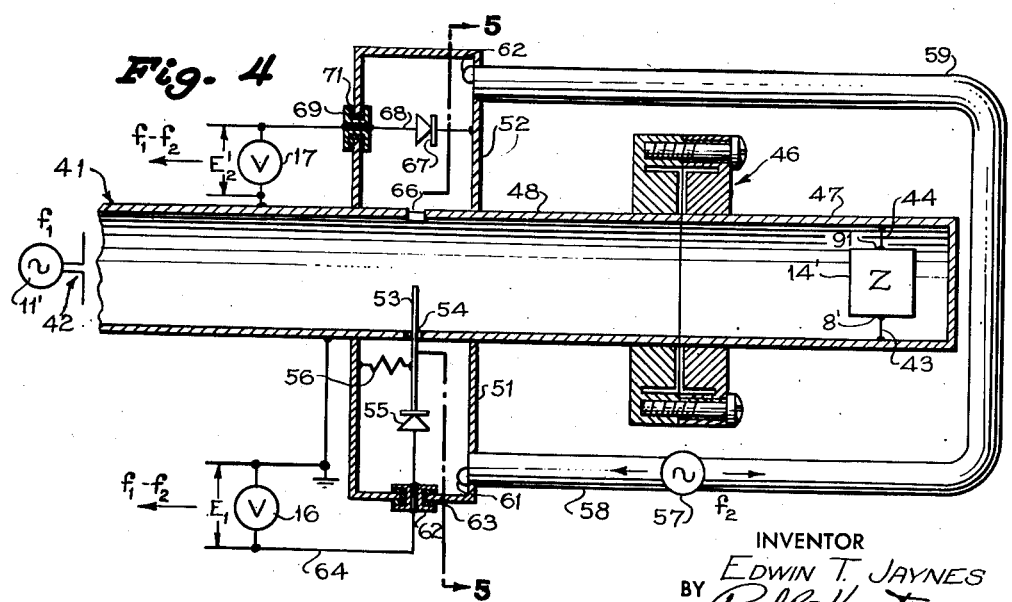
INVENTOR
EDWIN T. JAYNES
BY
ATTORNEY Patented May 6, 1952

2,595,675

UNITED STATES PATENT OFFICE 2,595,675

IMPEDANCE MEASURING APPARATUS

Edwin T. Jaynes, Washington, D. C., assignor to The Sperry Corporation, a corporation of Delaware Application April 21, 1945, Serial No. 589,479

14 Claims. (Cl. 175—183)

1

The present invention relates to impedance measuring devices, and more particularly to apparatus for measuring the alternating-current impedance of electrical devices or circuits.

It is well known that electrical measurements of direct-current resistance may be accomplished by a wide choice of methods and apparatus, including the use of a Wheatstone bridge for resistance measurement, and the use of a direct-reading ohmmeter. The Wheatstone bridge method of measurement involves making special adjustments for each resistance measurement, and it provides a very accurate resistance determination. The direct-reading ohmmeter, on the other hand, is usually somewhat less accurate, but is advantageous in the regard that the resistance of a device is readily ascertained without the requirement for a special adjustment procedure. Thus, where extreme accuracy is not necessary in direct-current resistance measurements, the direct-reading ohmmeter makes possible reliable resistance determination with fair accuracy and with minimum requirement of time and skill of the operator.

For alternating-current measurement of impedance, an elaborate bridge arrangement usually is used, including variable resistance elements and variable reactance elements which must be adjusted by a painstaking and laborious process, requiring the attention of a skilled operator, before the measuring data may be obtained.

It is a principal object of the present invention to provide improved alternating-current impedance measuring apparatus.

Another object of the present invention is to provide improved apparatus for providing a direct-reading alternating-current resistance measurement.

A further object is to provide direct-reading apparatus for reactance measurement.

Yet a further object is to provide apparatus for indicating directly the resistance component and the reactance component of a complex impedance.

It is another object of the present invention to provide apparatus for producing an output voltage varying as a predetermined component of impedance of a circuit or an impedance device.

In one form of the present invention, an alternating voltage of a predetermined frequency is applied to an impedance device, resulting in a flow through the device of alternating current of a magnitude and phase relative to the applied voltage dependent upon the magnitude and the phase angle of the impedance of the device. The voltage across the device at the instant of zero current therethrough is proportional to the reactance component thereof, and the value of a 90° phase-shifted version of the voltage wave at the instant of zero current therethrough is proportional to the resistance of the device. Accordingly, the voltage across the impedance device may be applied to a direct-reading reactance indicating instrument, and a 90° phase-shifted version of the voltage across the device may be applied to a direct-reading resistance indicating instrument. Means are provided for rendering both the resistance indicating meter and the reactance indicating meter responsive to the above voltages only during the successive instants of zero current flow through the impedance device.

The above objects and brief description will be made clear by reference to the following detailed description taken in conjunction with the drawings, wherein:

Fig. 3 is a schematic diagram showing a modification of the part of the apparatus in Fig. 1 to the right of line A—A;

Fig. 4 illustrates, partly in cross-section, a modification of the portion of the circuit arrangement shown to the left of line A—A in Fig. 1; and Fig. 5 is a cross-sectional view taken on the line 5—5 of Fig. 4.

Figure 1:
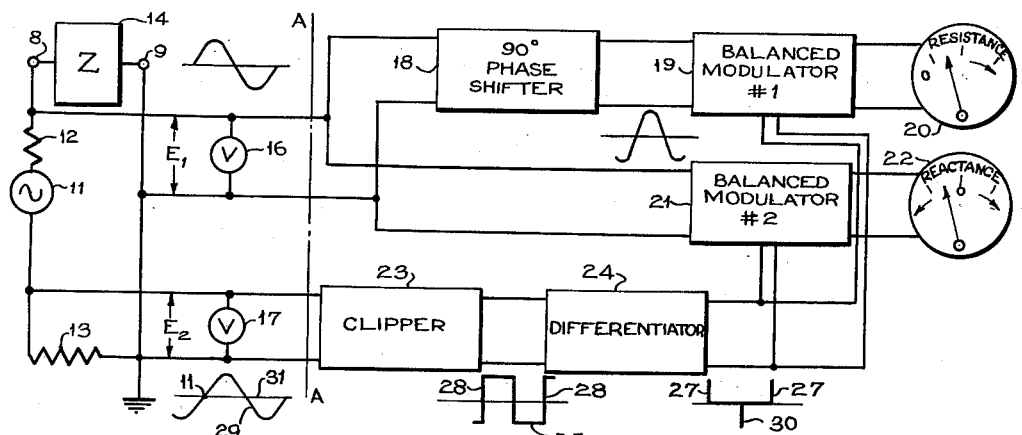
Fig. 1 is a schematic diagram illustrating a preferred embodiment of the present invention for operation in a low or medium frequency range.

Referring now to Fig. 1, an alternating-current source 11 is shown connected in series with a first resistor 12 and a second resistor 13 for applying a voltage $E_1$ to the terminals 8, 9 of a device 14 whose impedance is to be measured. A voltmeter 16 may be connected across the device 14 for indicating the voltage produced thereacross, while a second voltmeter 17 may be connected across the resistor 13 for indicating a voltage $E_2$ proportional to the current through the impedance device 14. Preferably, the resistor 12 has a high value of resistance, so that the current through the impedance device 14 is limited thereby to a substantially constant value, the series combination of source 11 and resistor 12 serving in effect as a "current source"; and the resistance of element 13 is made very small, the resistance value of this element being just sufficient to provide a convenient value of voltage $E_2$.

The voltage $E_1$ produced across the impedance 14 by the current from source 11 through resistor 12 is applied to the input terminals of a 90° phase shifter 18, the output terminals of which are connected to a first pair of input terminals of a first balanced modulator 19. The output terminals of balanced modulator 19 are connected to a direct-current voltmeter 20. The voltage $E_1$ across the device 14 is also applied to a first pair of input terminals of a second balanced modulator 21, whose output terminals are connected to a zero-center direct-current voltmeter 22 calibrated in terms of inductive and capacitive reactance.

The voltage $E_2$ across resistor 13, which is proportional to and in phase with the current through the impedance device 14, is applied to the input terminals of a "clipper" circuit 23 whose output terminals are connected to the input terminals of a "differentiator" 24. The output terminals of the differentiator are connected to a second or triggering pair of input terminals of the first balanced modulator 19, and also to a second or triggering pair of input terminals of the second balanced modulator 21.

Figure 2:
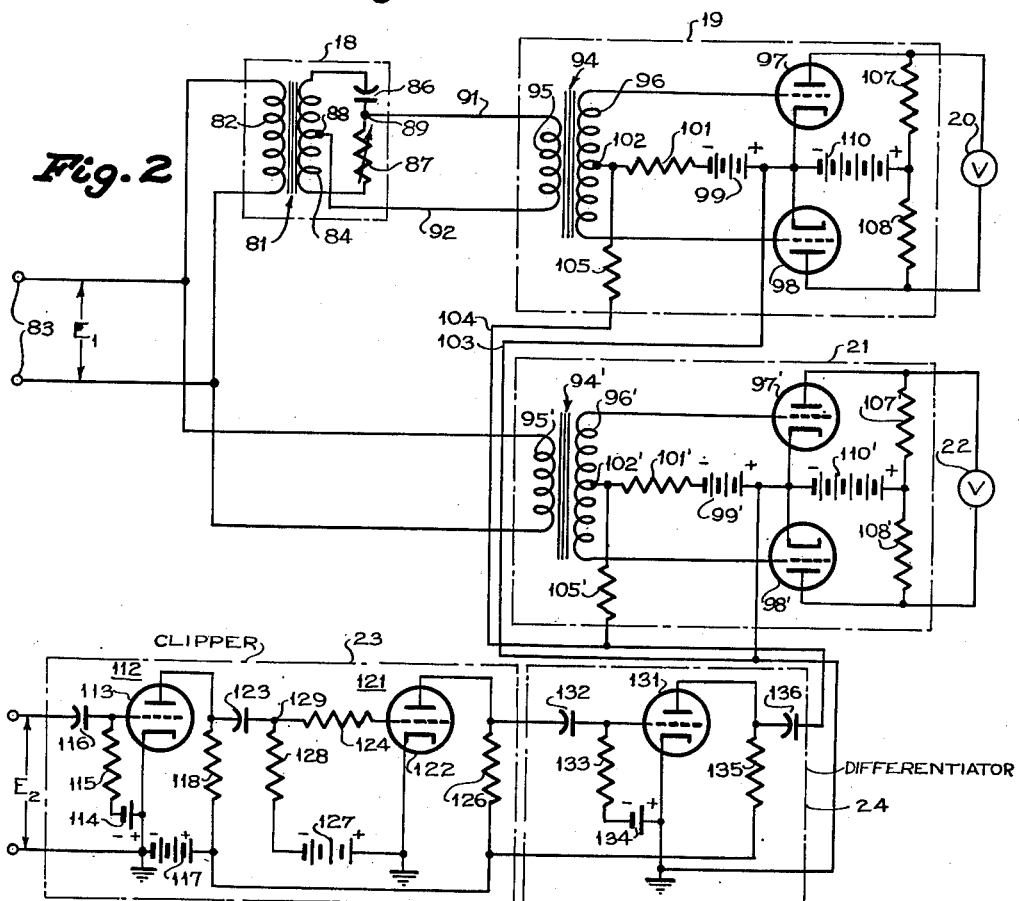
Fig. 2 is a circuit diagram illustrating the details of the apparatus shown in Fig. 1 to the right of line A—A.

Details of the circuit portions of the impedance measuring apparatus schematically indicated to the right of the line A—A in Fig. 1 are shown in Fig. 2. The 90° phase shifter 18 is illustrated as comprising an input transformer 81 having a primary winding 82 connected to the input terminals 83 for receiving the voltage $E_1$. The transformer 81 has a center-tapped secondary winding 84, to the end terminals of which is connected a series circuit including a capacitor 86 and a resistor 87. The resistor 87, which may be variable if desired, is adjusted to have a resistance equal to the magnitude of reactance of capacitor 86 at the frequency of the alternating voltage $E_1$. The output of the phase shifter 18 is realized between the center tap 88 of the transformer secondary winding 84 and the junction 89 of the series-connected capacitor 86 and resistor 87.

This output voltage is connected by conductors 91 and 92 to the first input circuit of the balanced modulator 19. Phase shifters of the type illustrated at 18 in Fig. 2 are well known in the art, and it is well known that the voltage produced between the output terminals of such a phase shifter is shifted 90° from the input voltage phase thereof when the magnitudes of resistance and reactance in the series circuit are equal.

The balanced modulator 19 is illustrated as comprising an input transformer 94 having a primary winding 95 connected to the input conductors 91 and 92, and a center-tapped secondary winding 96. Two electron discharge devices illustrated as triode vacuum tubes 97 and 98 are provided in the balanced modulator 19. The control grids of the triodes 97 and 98 are connected to the end terminals of the secondary winding 96, and the cathodes of triodes 97 and 98 are connected together and, through a bias battery 99 and a bias coupling resistor 101, are connected to the center tap 102 of the secondary winding 96. The cathodes of the triodes 97 and 98 are connected also to one conductor 103 of a second input circuit, the other conductor 104 of which is connected through a resistor 105 to the center tap 102 of transformer secondary winding 96. The anodes of the triodes 97 and 98 are connected through resistors 107 and 108, respectively, to the positive terminal of an anode voltage supply source 110, the negative terminal of which is connected to the cathodes of the two triodes.

The circuit junctions of the anodes of triodes 97 and 98 with the resistors 107 and 108 form the output terminals of the balanced modulator 19, and these junctions are connected to a direct-current voltmeter 20, which, as pointed out in the description of Fig. 1, serves as a direct-reading resistance component indicating instrument.

The circuit details of the balanced modulator 21 may be exactly similar to those of the balanced modulator 19 and, accordingly, the elements of the balanced modulator 21, designated with primed numeral designations otherwise similar to those of the corresponding elements of the balanced modulator 19, may be readily understood from the foregoing description of the circuit arrangements of modulator 19.

The cascade-connected clipper stage 23 and differentiator stage 24 involve circuits and techniques which are well known in the television art. These elements are described here briefly, in order that the relations of the cascade clipper and differentiator with the other elements of the impedance measuring apparatus will be clearly understood. The clipper 23 may comprise a conventional resistance-capacitance coupled voltage amplifier 112 including a triode electron discharge device 113, a grid bias battery 114 and bias coupling resistor 115, an input coupling capacitor 116, an anode voltage source 117, and an anode load resistor 118. The amplified anode output of the amplifier 112 may be applied to the grid circuit of a further triode stage 121 arranged to distort the wave form of the high-amplitude voltage produced by amplifier 112 into a substantially square output wave shape. For this purpose, the vacuum-tube stage 121 may include a triode 122 having a control grid coupled through capacitor 123 and an input signal-distorting resistor 124 to the anode of the triode 113. The anode of the vacuum tube 122 may be coupled through a resistor 126 to the positive terminal of the anode source 117, and a bias battery 127 connected through a bias coupling resistor 128 to the junction 129 between the capacitor 123 and resistor 124 may be provided for negatively biasing the grid of the triode 122 to a voltage approximately equal to one-half the voltage required to prevent anode current flow through the triode 122. The amplitude of the alternating voltage supplied by the amplifier 112 through the coupling capacitor 123 far exceeds the bias voltage provided by the battery 127, so that the voltage swing produced at the junction 129 is from a peak negative value far in excess of cut-off bias for the triode 122 to a peak positive value which represents a high positive voltage with respect to the potential of the cathode of triode 122. During the greater part of the negative half cycle of the voltage thus produced at junction 129, the anode output voltage of the stage 121 is substantially constant, being at a maximum value substantially equal to the voltage of the anode supply source 117. Thereafter, the voltage of junction 129 is carried abruptly through the range from cut-off grid bias of vacuum tube 122 to zero grid bias of the triode, after which the voltage of the junction 129, rising steeply positive with respect to the cathode, results in grid current flow through the triode 122 and a limiting action in resistor 124 which prevents the grid voltage of the triode 122 from rising appreciably positive. The resultant output voltage wave produced by the clipper 23 is shown at 25 in Fig. 1. The very abrupt "swings" 28 of the clipper output voltage from maximum negative potential to maximum positive potential occur simultaneously with the passage through the zero axis 31 of the wave 29 of voltage $E_2$ representing the current through impedance device 14.

A differentiator amplifier stage 24 is coupled to the output of the triode 122. The differentiator 24 may comprise a vacuum-tube amplifier stage such as a triode 131 having a grid circuit coupled by a very high-impedance capacitance coupling element 132 to the output of the stage 121. The triode 131 may be provided with a relatively low-impedance biasing resistor 133 connected in series with a bias battery 134 between the cathode and the grid of the triode 131. Anode resistor 135 may be provided for coupling the anode of the triode 131 to the positive terminal of the anode voltage source 117, and an output capacitor 136 may be provided for coupling the anode of triode 131 to the second input or triggering circuits of the balanced modulators 19 and 21.

By virtue of the selection of an input coupling capacitor 132 characterized by very high impedance at the frequency of the voltage $E_2$, compared with the impedance of the grid bias coupling resistor 133, the coupling circuit 132, 133 serves as a differentiating circuit of such characteristics that the differentiator stage 24 produces an output wave corresponding to the derivative or the rate of change of the output wave 25 (Fig. 1) produced by the clipper 23. Thus, at the moment of abrupt change from maximum positive potential output to maximum negative potential output of the clipper stage, the differentiator produces a momentary high-potential output signal 27 (Fig. 1). During the intervals of substantially constant output potential of the clipper 23, the output of the differentiator 24 is substantially zero, and at a moment of abrupt change 28 from maximum negative potential to maximum positive potential in the output voltage wave 25 of the clipper 23, the differentiator produces a further momentary high-potential output signal 30.

The high-potential output impulses of the differentiator 24, coincident with the alternate abrupt changes of the output potential of clipper 23, occur simultaneously with the passage through zero of the current through the impedance device 14.

The balanced modulator 19 cooperates with the output voltmeter 20 to indicate the momentary intensity of the voltage version applied thereto through phase shifter 18 at the instant of a positive output voltage pulse applied to modulator 19 by the differentiator stage 24. The balanced modulator 21 similarly cooperates with the output voltmeter 22 to indicate the momentary value of voltage $E_1$ at the instant of a positive output voltage pulse applied to modulator 21 by the differentiator stage 24. Preferably, the bias batteries 99 and 99' of the balanced modulators 19 and 21 provide sufficient bias voltage to prevent any current flow through the triodes during the intervals between high-intensity output impulses from differentiator 24.

At the moment when the voltage $E_2$ is passing through zero, an output impulse is supplied by the differentiator 24 to the second or triggering input circuit of each of the balanced modulators 19 and 21, and the positive pulses shown at 27 in Fig. 1 overcome the bias from batteries 99 and 99', rendering the balanced modulators responsive to the input signal voltages across transformer secondary windings 96 and 96'. At these instants of zero current through impedance 14, the voltage across transformer secondary 96 is proportional to the resistance component of impedance 14, and the voltage across transformer secondary 96' is proportional to the reactance component of the impedance 14, the polarity of the voltage across secondary 96' being indicative of the sign of the reactance.

Accordingly, the average voltage indicated by the direct-current voltmeter 20 is determined by the resistance component of impedance 14, and the average voltage indicated by the direct-current voltmeter 22 is determined by the reactance component of impedance 14. Thus, the voltmeters 20 and 22 may be calibrated directly in terms of ohms of resistance and ohms of reactance, respectively, the scale factors of the instruments being determined according to the voltage and frequency of source 11 and the values of the other circuit elements in the circuit supplying alternating-current energy to the impedance device 14.

It is not essential to the present invention that vacuum-tube balanced modulators of the type shown at 19 and 21 in Figs. 1 and 2 be utilized in connection with output voltmeters 20 and 22, respectively, as means for providing instantaneous response to the voltage between terminals 8 and 9 at the instants of zero current through the impedance 14. If desired, as indicated in Fig. 3, the balanced modulator 19 and the output voltmeter 20 may be replaced by a dynamometer-type galvanometer 20' for indicating the resistance component of the impedance device 14, and the balanced modulator 21 and output galvanometer 22 may be replaced by a second dynamometer-type galvanometer 22' for indicating the reactance component of the impedance device 14.

The dynamometer-type galvanometer 20' comprises fixed coils 141, 142 arranged to provide an alternating magnetic field. A movable element 143, including an indicating pointer or needle 144 and a coil 145 attached thereto, is pivoted for rotation of the coil 145 within a high-intensity portion of the magnetic field of coils 141 and 142, and is restrained in a normal zero-reading position by a hair spring 146. The scale 147 of the instrument 20' may be calibrated directly in terms of resistance.

The sinusoidal output wave of the version of voltage $E_1$ shifted 90° in phase by the phase shifter 18 provides sinusoidal excitation of the dynamometer field coils 141 and 142 through a series resistor 148. The movable coil 145 of the dynamometer is connected through a series resistor 149 to the output terminals of the differentiator 24. The movable coil 145 is periodically energized by the momentary pulses produced by the differentiator 24, so that the deflection of the needle 144 from the spring biased position thereof is dependent upon the strength of the magnetic field produced by the coils 141 and 142 at the successive moments of energization of the coil 145. Thus, this deflection is indicative of the resistance component of the impedance device 14. The reactance indicating dynamometer-type galvanometer 22' is generally similar to the resistance reading instrument 20' except that the needle 144' of the instrument 22' is normally positioned by the hair spring 146' at the midpoint of the reactance calibration scale 147'.

The circuit arrangements shown in Figs. 1, 2 and 3 described thus far are readily suited for measurement of impedance at low and medium frequencies. For measurement of impedance at ultra-high frequencies, however, it is desirable to provide a frequency transformation such that the phase shifter, the clipper and differentiator, and the instantaneous voltage-responsive indicating devices may be operated at a relatively low frequency.

In Figs. 4 and 5 is shown an arrangement by means of which an impedance device 14' is adapted to be positioned within a hollow-pipe wave guide 41, supplied with energy from an energy source 11' cooperating with an antenna 42, and relatively low-frequency voltages $E_1'$ and $E_2'$ may be produced for application to the portion of the apparatus represented in Fig. 1 to the right of line A—A.

Impedance device 14' having terminals 8' and 9' preferably is connected across the inside of the hollow-pipe wave guide 41 by means of wires 43 and 44 which preferably are aligned substantially parallel with the antenna 42, through which the energy from the generator 11' is supplied to the wave guide 41.

Preferably, also, a choke coupling joint 46 may be provided intermediate the right-hand portion 47 of the wave guide 41 and the left-hand portion 48 thereof extending from the choke coupling unit 46 substantially to the exciting antenna 42. At a position substantially one-half wavelength removed from the choke coupling joint 46, two cavity resonators 51 and 52 are formed on opposite sides of the wave guide 41. The first of these cavity resonators 51 is coupled to the wave guide 41 by means of a probe 53 extending through an opening 54 in the hollow-pipe wave guide 41. The probe 53 may be connected to a crystal detector 55, and may also be connected through a resistor 56 to the inner wall surface of the resonator 51. The crystal detector 55 is by-passed to the wall of resonator 51 by a capacitor formed by a metal bushing 62 inserted through a dielectric spacer or grommet 63. A second high-frequency source 57 arranged to produce a strong output signal at a frequency $F_2$ slightly removed from the frequency $F_1$ of the source 11' is coupled through coaxial transmission lines 58 and 59 and electromagnetic coupling loops 61 and 62 to the cavity resonators 51 and 52.

Through the probe 53, the cavity resonator 51 is excited by the electric field intensity across the wave guide at the position of the probe 53 which is proportional to the voltage across the wave guide at the choke coupling joint 46 and, hence, is proportional to the voltage across the impedance device 14'. As a result of the relatively weak excitation of the resonator 51 through the probe coupling device 53 and of the substantially constant relatively strong excitation of the resonator 51 by the injection of energy at frequency $F_2$, the crystal detector 55 is enabled to function as a frequency-mixer device, delivering an output signal voltage $E_1'$ between an output conductor 64 and the grounded resonator wall, the output signal having a frequency equal to the difference between the frequencies of source 11' and source 57 and being of amplitude and phase dependent upon the amplitude and phase of the voltage across the impedance device 14'.

The second resonator 52 is also supplied with high-intensity excitation at frequency $F_2$ of a substantially constant amplitude by the source 57 through the transmission line 59 and the coupling loop 62. The resonator 52 is coupled to the energy transmitted through the hollow-pipe wave guide 41 from the antenna 42 to the impedance device 14' by a slit 66 through the hollow-pipe wave guide 41 at a position opposite the probe 53. The voltage produced across the slit 66 is substantially proportional to the current through the impedance device 14', and the phase of the voltage across slit 66 is determined by the phase of the current through impedance 14'.

A crystal detector 67 may be provided within the resonator 52 and arranged with an output conductor 68 extending through a metal bushing 69 positioned in an opening in the wall of the resonator 52 and insulated from this wall by an insulating bushing or grommet 71, the bushing 69 and the insulating grommet 71 being arranged to serve as an ultra-high-frequency by-pass capacitor between the conductor 68 and the wall of the resonator 52. Between the conductor 68 and the grounded structure including hollow-pipe wave guide 41 and the cavity resonator 52 is produced a second output voltage $E_2$ at a frequency equal to the difference between the frequencies of sources 11' and 57. Voltage $E_2$ varies in amplitude and phase substantially in proportion to the amplitude and phase of the current through the impedance device 14'.

It will be readily apparent that the voltages $E_1$ and $E_2$ at the frequency equal to the difference between frequencies of sources 11' and 57 may be applied to the circuits, including the phase shifter 18, the balanced modulators 19 and 21, the output voltmeters 20 and 22, the clipper 23 and the differentiator 24, shown to the right of the line A—A in Fig. 1, or to the circuits shown in Fig. 3 embodying dynamometer-type indicating instruments. Of course, in such an arrangement, the phase shifter 18 as well as the cascade-connected clipper 23 and differentiator 24 must be designed for operation at a frequency equal to the difference between frequencies $F_1$ and $F_2$ of sources 11' and 57.

Since the low-frequency output voltages $E_1'$ and $E_2'$ produced by the heterodyne system of Figs. 4 and 5 are representative in phase and amplitude of the voltage between terminals 8' and 9' of impedance 14' and the current through the impedance, it will be readily apparent that the instantaneous intensity measurement of one of these low-frequency voltages under timing control by the other may be employed for impedance component measurements which are accurately indicative of the resistance and reactance components at the ultra-high frequency $F_1$ of the impedance of the device 14'.

It is obvious from the foregoing description that the present invention provides separate indications of resistance and reactance of an impedance. Of course, either of these impedance components could be measured without any regard to the other, if desired. Furthermore, it will be obvious that apparatus provided for measurement of reactance may be utilized also for resistance measurement by the selective variation through a 90° phase angle of one of the voltages $E_1$ and $E_2$.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for measuring a component of an impedance connected between two terminals, including a source coupled to said terminals for passing an alternating current of predetermined amplitude through said impedance and thereby producing a resultant alternating voltage between said terminals; voltage indicating means including two input circuits and having the characteristic that both of said input circuits must be energized simultaneously to provide an indication, and means coupling one of said input circuits to said terminals; timing means connected between said source and said terminals and responsive to said current to produce a brief pulse coincidentally with the passage of the instantaneous value of said current through zero, and means applying said pulses to the other of said input circuits.

2. Apparatus as defined in claim 1, wherein said voltage indicating means comprises a balanced modulator having a first input circuit responsive to said resultant voltage and a second input circuit responsive to said timing means, and a meter coupled to said modulator for indicating the unbalance therein.

3. Apparatus as defined in claim 1, wherein said voltage indicating means comprises a dynamometer-type galvanometer having a first input circuit responsive to said resultant voltage and a second input circuit responsive to said timing means.

4. Apparatus for measuring a predetermined component of an impedance, comprising two impedance terminals, means connected to said terminals for passing an alternating current through said impedance and producing a resultant alternating voltage between said terminals, a phase shifter coupled to said terminals, voltage indicating means including two input circuits and having the characteristic that both of said input circuits must be energized simultaneously to provide an indication, one of said input circuits being coupled to said phase shifter for receiving therethrough said alternating voltage, timing means responsive to the current through said impedance for generating a brief pulse coincidentally with the passage of said current through zero, and means applying said pulses to the other of said input circuits.

5. Apparatus for measuring a predetermined component of an impedance connected between two terminals, comprising means connected to said terminals for passing an alternating current through said impedance and producing a resultant alternating voltage between said terminals, timing means responsive to the current through said impedance for producing output impulses at instants when said current is zero, said timing means including a clipper stage with its input terminals in series with said impedance, and a differentiator stage connected to the output of said clipper stage, a balanced modulator having a first input circuit coupled to said terminals for receiving said resultant voltage and a second input circuit coupled to said timing means for receiving said output impulses, and means for indicating an unbalanced output condition in said modulator.

6. Apparatus for measuring a predetermined component of an impedance connected between two terminals, comprising means connected to said terminals for passing an alternating current through said impedance and producing a resultant alternating voltage between said terminals, timing means including cascade-connected clipper and differentiator stages responsive to the current through said impedance for producing output impulses at instants when said current is zero, and a dynamometer-type galvanometer having a first coil circuit coupled to said terminals and a second coil circuit coupled to said cascade-connected clipper and differentiator stages for indicating the intensity of said resultant voltage at the instants of said output impulses.

7. Apparatus for measuring the resistive and reactive components of an impedance, comprising two terminals for connection to an impedance, means connected to said terminals for passing an alternating current through said impedance and producing a resultant alternating voltage between said terminals, first voltage indicating means including two input circuits and having the characteristic that both of said input circuits must be energized simultaneously to provide an indication, one of said input circuits being coupled to said terminals, a phase shifter also coupled to said terminals, second voltage indicating means similar to said first voltage indicating means and having the corresponding one of its input circuits coupled to said phase shifter for receiving therethrough said alternating voltage, and timing means responsive to the current through said impedance for producing a brief pulse coincidentally with the passage of the instantaneous value of said current through zero, and means applying said pulse to the other input circuits of said first and second voltage indicating means.

8. Apparatus for producing an output voltage proportional to the reactance component of an impedance, comprising means for applying an alternating voltage to said impedance, means responsive to the current through said impedance for producing a timing wave having pulses at the instants of zero current through said impedance, a balanced modulator including two input circuits and means for applying to said circuits respectively the alternating voltage across said impedance and said timing wave for producing instantaneous output voltage pulses synchronous with said instants of zero current through said impedance and substantially proportional to the voltage across said impedance at said instants.

9. Apparatus for producing two low-frequency output voltages having amplitude and phase relations determined by the resistance and reactance components of an impedance, comprising a first source of ultra-high-frequency energy, a hollow-pipe energy conductor for coupling said first energy source to said impedance, a first heterodyne mixer so coupled to said hollow-pipe conductor as to receive therefrom a signal of amplitude and phase dependent upon the voltage across said impedance, a second heterodyne mixer so coupled to said hollow-pipe conductor as to receive therefrom a signal of amplitude and phase dependent upon the current through said impedance, and a second source of ultra-high-frequency energy of a frequency different from the frequency of said first source coupled to said first and second heterodyne mixers, whereby said first and second mixers produce output voltages of frequency equal to the difference between the frequencies of said first and second sources.

10. Apparatus for measuring a predetermined component of an impedance, comprising: a first source of ultra-high-frequency energy, a hollow-pipe energy conductor for coupling said first energy source to said impedance, a first heterodyne mixer so coupled to said hollow-pipe conductor as to receive therefrom a signal of amplitude and phase dependent upon the voltage across said impedance, a second heterodyne mixer so coupled to said hollow-pipe conductor as to receive therefrom a signal of amplitude and phase dependent upon the current through said impedance, and a second source of ultra-high-frequency energy of a frequency different from the frequency of said first source coupled to said first and second heterodyne mixers, whereby said first mixer produces a first output voltage of frequency equal to the difference between the frequencies of said first and second ultra-high-frequency sources and of amplitude and phase dependent upon the amplitude and phase of the ultra-high-frequency voltage across said impedance, and said second mixer produces a second output voltage of frequency equal to the difference between the frequencies of said first and second ultra-high-frequency sources and of amplitude and phase dependent upon the amplitude and phase of the ultra-high-frequency current through said impedance; and means jointly responsive to said first and second output voltages for indicating the instantaneous intensity of one of said output voltages at intervals controlled by the other of said output voltages.

11. Apparatus for measuring a predetermined component of an impedance, comprising a source of energy of a first high frequency, means for coupling said source to said impedance to produce a high-frequency current therethrough and a high-frequency voltage thereacross, a first heterodyne mixer connected to said coupling means for receiving therefrom a signal dependent on the voltage across said impedance, a second heterodyne mixer connected to said coupling means for receiving therefrom a signal dependent on the current through said impedance, a source of energy of a second high frequency coupled to said first and second heterodyne mixers whereby first and second output voltages are produced by said mixers at a frequency equal to the difference between said first and second high frequencies, and means coupled to said first and second heterodyne mixers for indicating the instantaneous intensity of one of said output voltages at intervals controlled by the other of said output voltages.

12. The method of measuring a component of an impedance, comprising the steps of passing an alternating current of known amplitude through said impedance to thereby produce an alternating voltage across said impedance, and determining the instantaneous value of said alternating voltage at instants when the instantaneous value of said current is zero.

13. The method of measuring the resistive component of an impedance, comprising the steps of passing an alternating current of known amplitude through said impedance to thereby produce an alternating voltage across said impedance, shifting the phase of said alternating voltage by ninety degrees, and determining the instantaneous value of said alternating voltage which corresponds to the passage of the instantaneous value of said current through zero.

14. Apparatus for measuring a component of an impedance, comprising means for passing an alternating current of known amplitude through said impedance to produce an alternating voltage across said impedance, and means for determining the instantaneous value of said alternating voltage at instants when the absolute instantaneous value of said current is at one of its extremes.

EDWIN T. JAYNES.

REFERENCES CITED

The following references are of record in the file of this patent:

UNITED STATES PATENTS

| Number | Name | Date |
| --- | --- | --- |
| 1,660,405 | Affel | Feb. 28, 1928 |
| 2,279,053 | Modlinger | Apr. 7, 1942 |
| 2,314,851 | Barney et al. | Mar. 23, 1943 |
| 2,320,476 | Schrader | June 1, 1943 |
| 2,470,412 | Piety | May 17, 1949 |

OTHER REFERENCES

Electronics, May 1943, pages 86–88, 176 and 178.